TUNED AMPLIFIER NEUTRALIZATION SYSTEM

Filed April 22, 1954

INVENTORS.
Leopold A. Horowitz
& Gilbert C. Hermeling Jr.
BY H. O. Meuston
ATTORNEY 2,902,546

TUNED AMPLIFIER NEUTRALIZATION SYSTEM

Leopold Albert Horowitz, Haddonfield, and Gilbert C. Hermeling, Jr., West Collingswood, N.J., assignors to Radio Corporation of America, a corporation of Delaware Application April 22, 1954, Serial No. 424,858

4 Claims. (Cl. 179—171)

This invention relates to tuned amplifier circuits for high frequency signaling systems. More particularly, the invention relates to neutralization of the tuned high frequency amplifier circuits used for amplification of intermediate frequency signals and the like.

It is generally recognized that certain types of amplifier circuits designed for high frequency amplification require neutralization. Neutralization is ordinarily required as a result of instability due to the uncompensated effects of the input capacitance of the amplifier, which is primarily due to the interelectrodal capacitance of the tube.

In a triode tube, when a signal voltage is applied to the input circuit, current flows from grid to cathode and from grid to anode as a result of the capacity between these electrodes. Since the part of the current that flows to the anode depends on the difference between the signal applied to the control grid and the amplified voltage developed in the anode circuit, the input admittance is affected by the magnitude and phase of the amplification.

In modern high frequency signal receivers such as radio and television receivers, miniaturization and other space saving techniques aggravate any inherent instability of a high frequency amplifier by providing additional stray capacitive and inductive current paths. The recent trend toward the miniaturization of tubes, and the enclosure of several tubes in a single envelope to save space, provides conditions which cause additional interelectrode or stray capacitances which may contribute to the instability of the amplifying system.

In accordance with the present invention, the interelectrode capacitances between the filament and other elements of the tube are used to advantage as part of the neutralization circuit of a tuned high frequency amplifier. In one embodiment of the invention, a tuned high frequency amplifier using a triode tube of the type having a cathode heated by a filament, has a tuning inductor connected in the filament circuit effectively between the filament and signal ground. It has been found that by properly selecting the inductance value of the inductor in combination with the effective stray and interelectrode capacitances, a potential may be derived from the output circuit of the triode and developed across the terminals of the inductor of the proper phase and magnitude to neutralize the triode amplifier. This potential is then fed through the filament to cathode capacity to the cathode circuit to balance out the unstabilizing effects.

Accordingly, a primary object of this invention is to provide an improved neutralizing system for tuned high frequency electron tube amplifiers which effectively utilizes the tube interelectrodal capacitances as elements thereof.

Another object of this invention is to provide a neutralizing network for tuned high frequency amplifiers which utilizes the interelectrode capacitance between the filament and other elements as part of the neutralization circuit.

A further object of this invention is to provide a tuned frequency amplifier including one electron discharge device and one or more other electron discharge devices having an improved neutralizing circuit which utilizes as part of the network, the capacitance existing between the filament and other electrodes of said one discharge device.

The novel features that are considered characteristic of this invention are set fotrh with particularity in the appended claims. The invention itself, however, both as to its organization and method of operation, as well as additional objects and advantages thereof, will best be understood from the following description when read in connection with the accompanying drawing, in which:

Figure 2:
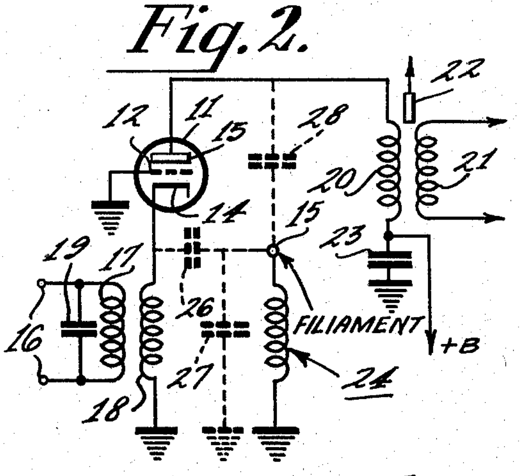
Figure 2 is an equivalent schematic circuit diagram of the tuned high frequency amplifier shown in Figure 1 which shows certain inherent interelectrode capacitances of the electron tube in dotted lines.
Figures 2A, 3, 4:
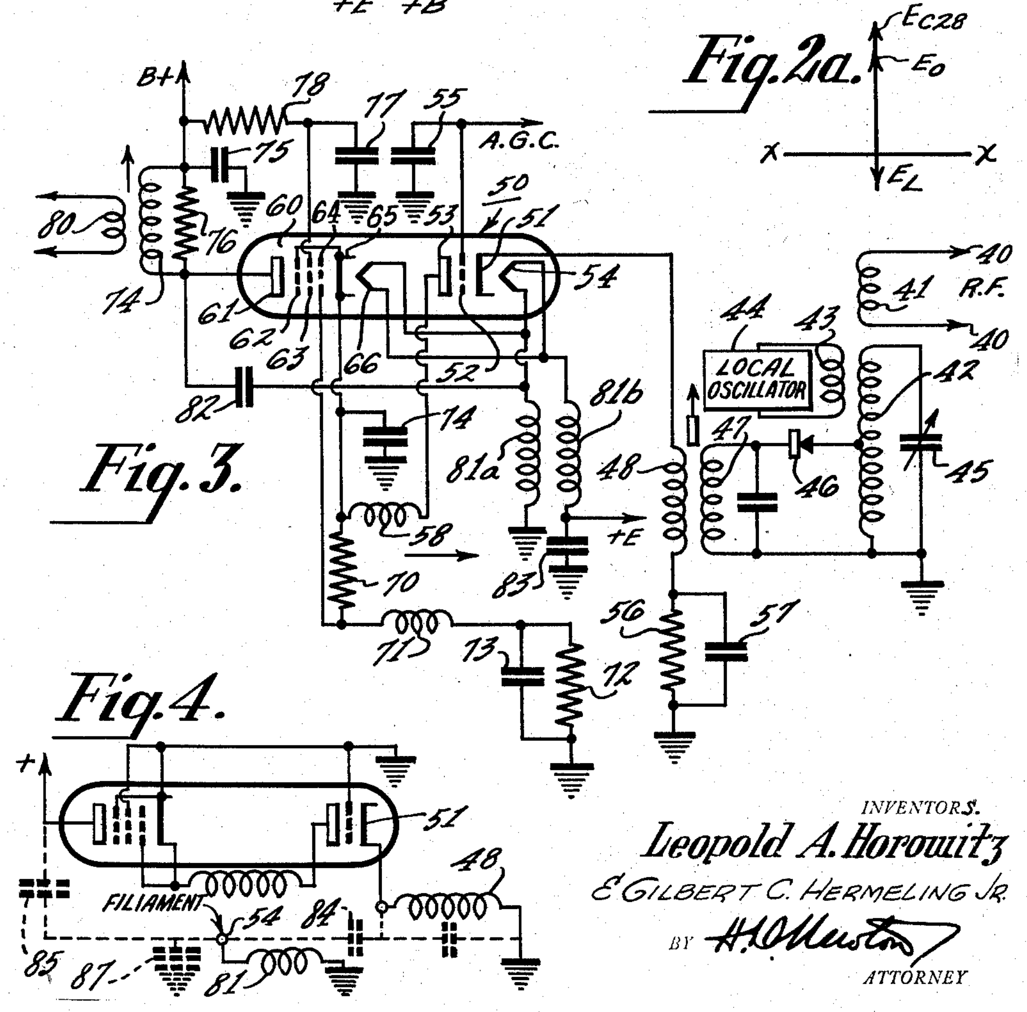

Figure 2*a* is a vector diagram illustrating the phase relationships across certain portions of the neutralization network shown in Figure 2;

Figure 3 is a schematic circuit diagram of a two-stage tuned high frequency amplifier provided with neutralization in accordance with the invention; and Figure 4 is an equivalent schematic circuit diagram of the R.F. circuit of the tuned high frequency amplifier shown in Figure 3 illustrating in dotted lines the inherent interelectrode capacities which form a part of the neutralization circuit.

Figure 1:
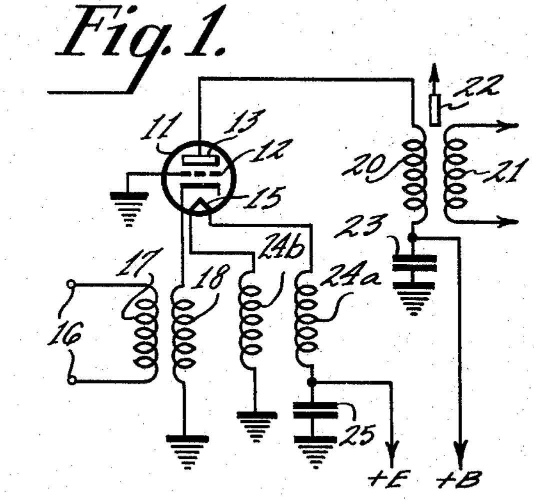
Figure 1 is a schematic circuit diagram of a tuned high frequency amplifier, which is provided with a neutralization circuit in accordance with the invention.

Referring to Figure 1, a triode electron tube 11 having a control electrode 12, an anode 13, a cathode 14, and a filament 15, is connected for operation as an intermediate frequency amplifier. A pair of signal input terminals 16 are connected with a source of intermediate frequency signals, not shown, which for example, may be a mixer or a preceding intermediate frequency amplifier stage. The intermediate frequency signals applied to the terminals 16 are coupled through a high frequency transformer to the cathode 14 of the amplifier tube 11. The secondary winding 18 of the transformer is tuned by the input capacity of the triode 11 to the intermediate frequency and is connected between the cathode 14 and ground.

The control electrode 12 is connected with ground so that the amplifier operates as a conventional grounded grid amplifier. An output circuit connected with the anode 13, includes an intermediate frequency transformer having a primary winding 20 and a secondary winding 21. The primary winding 20 in combination with the inherent and stray anode to ground capacitance and the distributed capacitance of the winding forms a parallel circuit which is resonant at the intermediate frequency. If desired, a capacitor may be connected across the terminals of the primary winding 20 to provide additional capacitance.

The frequency of the output circuit may be adjusted by moving a core 22 relative to the high frequency transformer windings, whereby the effective inductance of the winding may be varied.

A capacitor 23 is connected between the bottom side of the primary winding 20 and ground to provide a low impedance path to ground for intermediate frequency signals, and a source of polarizing potential +B for the electron tube 11 is also connected to the bottom side of the primary winding 20.

The cathode 14 of the tube 11 is indirectly heated by the filament 15. One side of the filament 15 is connected through an inductor **24*b* to ground whereas the other side is connected through an inductor 24*a* to a source of filamentary energizing potential +E. A bypass capacitor 25 is connected from the bottom side of the inductor 24*a*** to ground, and is of such a value to provide a low impedance path to ground for signals of the intermediate frequency.

Referring to Figure 2, which shows a high frequency schematic circuit diagram including the neutralizing network, the filament is represented by the junction point 15. The filament to cathode capacitance is represented by the dotted line capacitor 26 and the filament to ground capacitance is represented by the dotted line capacitor indicated by the reference character 27. The filament to anode capacitance is indicated by the dotted line capacitor 28. It should be noted that the capacitances 26, 27, and 28 represent the composite effective interelectrode and stray circuit capacitances existing between the filament and the respective points mentioned. The inductors 24*a* and 24*b* shown in Figure 1 are lumped into an equivalent inductor 24 which is connected between the filament 15 and ground.

Since the unstabilizing effect of tuned high frequency amplifiers is due to the voltage fed back from the output circuit through the various inductive and capacitive paths of the amplifier circuit, neutralization can be effected by feeding back to the input circuit of the tube a voltage of substantially equal magnitude and opposite phase to the voltage fed back through these stray paths.

In order to accomplish this, the effective value of the inductance between filament and ground is selected so that it forms a series circuit with the composite anode to filament capacitance 28 having a resonant frequency well above the intermediate frequency. This series circuit is effectively connected across the output circuit including terminals of the primary winding 20. At the intermediate frequency this series circuit is capacitive and hence, the voltage across the inductor 24 is 180° out of phase with the voltage in the output circuit. The voltage across the inductor 24 is of opposite phase to that developed by the current flowing in the stray paths. Thus when the voltage across the inductor 24 is adjusted for proper amplitude and fed through the relatively large filament to cathode capacitance 26 to the cathode input circuit, the amplifier 11 can be neutralized.

The inductor 24 in combination with the filament to ground capacitance 27 effectively forms a parallel resonant circuit. In order that the reactance between filament and ground be inductive, the parallel circuit must be resonant at a frequency above the intermediate frequency. The extent of the effective inductance appearing between filament and ground is determined by the frequency of resonance of the parallel circuit. As mentioned above, it is the effective inductive reactance between filament and ground which forms the inductive portion of the series resonant circuit which is connected across the primary winding 20.

Referring to Figure 2*a*, the signal output voltage of the amplifier appearing across the transformer primary winding 20 is indicated by the vector $E_0$. Since the series resonant circuit is capacitive at the intermediate frequency, the voltage across the plate to filament capacitance 28, indicated by the vector $E_{C28}$, is in phase with the output voltage $E_0$.

The voltage across the inductor 24 is indicated by the vector $E_L$ and is 180° out of phase with the voltage across the capacitance $E_{C28}$ and the output voltage $E_0$. It can be seen that if $E_{C28}$ and $E_L$ are added vectorially the resultant potential is equal to $E_0$. The relative magnitude of $E_L$ may be varied by varying the frequency of resonance of the series resonant circuit. For example, the higher the requency of resonance of the series circuit, the smaller will be the voltage across the inductor 24 indicated by $E_L$. Accordingly, the frequency of resonance of the series net is adjusted until the voltage $E_L$ is substantially equal to the voltage produced by the current flowing in the input capacity, and as explained above, this voltage will be substantially 180° out of phase with the voltage across the stray paths and hence, will neutralize the amplifier.

Referring now to Figure 3, a two-stage high frequency amplifier including a grounded grid triode amplifier stage driving a pentode amplifier stage are connected for amplification of the intermediate frequency signals. An amplifier of this type is particularly useful for higher frequency signals such as the 40 mc. intermediate frequency signals of a television receiver. A source of radio frequency signals, not shown, is connected with a pair of terminals 40 and fed to a transformer winding 41. The radio frequency signals are mutually coupled through the transformer winding 41 to a mixer winding 42. The mixer winding 42 is also coupled to an oscillator winding 43 which supplies heretodyne signals from a local oscillator 44. The mixer winding 42 may be tuned to the intermediate or hererodyne frequency by means of a variable capacitor 55 which is connected across the terminals thereof.

A non-linear mixer element which may be, for example, a crystal mixer, is connected between a tap on the winding 42 and to a primary winding 47 of an intermediate frequency transformer. The primary winding 47 is tuned to the intermediate frequency by means of a shunt capacitor 48.

The intermediate frequency signals developed across the primary winding 47 are coupled to the secondary winding 48 which is connected to the signal input circuit of a triode tube 50. The tube 50 has an anode 53 a control electrode 52, a cathode 51 and a filament 54 for heating the cathode. The control electrode 52 is connected to ground through a capacitor 55 which has low impedance to signals of the intermediate frequency. A source AGC, not shown, is also connected to the control electrode for controlling the gain of the amplifier in accordance with the level of the received radio frequency signals. The cathode 51 of the triode is serially connected through the secondary winding 48 of the intermediate frequency transformer and a cathode bias resistor 56 to ground. A bypass capacitor 47 is connected across the terminals of the resistor 56 to prevent degeneration.

The pentode amplifier 60 has an anode 61, a suppressor grid 62, a screen grid 63, a control electrode 64, and a cathode 65 which is heated by a filament 66. Current flowing through the triode 50 also flows through the pentode 60, and is conducted from the anode 53 of the triode to the cathode 65 of the pentode through an inductor 58. The inductor 58 inductively coupled to a winding 71, and signals developed across the inductor 58 are coupled to the winding 71. One end of the winding 71 is connected to the control electrode 64 of the pentode and the other end is connected to ground through a resistor 72 which is bypassed by a capacitor 73. A grid return resistor 70 is connected between the control electrode 64 and cathode 65 of the pentode. The cathode 65 is effectively connected with ground for high frequencies through a bypass capacitor 74.

The intermediate frequency signals amplified by the pentode 60 are developed in an output circuit including a primary winding 75 of an intermediate frequency transformer, one end of which is connected with the pentode anode 61. The winding 74 may be tuned to the intermediate frequency by means of the distributed capacitance across the turns of the winding in combination with the distributed and stray capacitance existing between the anode 61 of the pentode 60 and ground. The other end of the winding 74 is connected through a bypass capacitor 75 to ground.

A source of polarizing potential +B for the triode and pentode tubes 50 and 60 is also connected through the intermediate frequency winding 74 to the anode 61 of the pentode 60. The screen grid 63 of the pentode tube 60 which is bypassed to ground through a capacitor 77, is also connected to the source of polarizing potential +B through a screen grid dropping resistor 78.

A resistor 76 is connected in parallel with the primary winding 74 of the intermediate frequency transformer to reduce the Q of the output circuit slightly in order to increase the signal bandwidth passed therethrough. A secondary winding 80 of the intermediate frequency transformer may be connected with appropriate utilization means such as further intermediate frequency stages of amplification or detection means.

The filaments 54 and 66 of the tubes 50 and 60 respectively, are shown as being connected in parallel. One side of the parallel combination is connected to ground through an inductor 81*a*. The other side of the filaments are connected through an inductor 81*b* to a source of filamentary energizing potential +E. The bottom side of the inductor 81*b* is connected to signal ground potential through a bypass capacitor 83.

Referring to Figure 4, which shows the equivalent high frequency neutralizing circuit diagram of the amplifier shown in Figure 3, the filament is indicated by the junction point designated 54. The filament to the triode cathode capacitance is indicated by a capacitor 84 which is shown in dotted lines. The inductance 81 represents the parallel equivalent of the inductors 81*a* and 81*b* connected between the filaments 66 and 54 and ground. The capacitance between the filaments and the pentode cathode together with the capacitance between the filament and ground, is indicated by a capacitor 87 which is shown in dotted lines. A capacitor 85 also shown in dotted lines, includes the filament to pentode plate capacitance in combination with the capacitance of the optional external capacitor 82 shown in Figure 3.

When a triode and pentode are placed in the same envelope as shown in Figure 3, the electrodes of the tube and the pins of the tube and socket provide coupling paths that are unavoidable. In a tube of this type, not only do the interelectrode capacities provide undesired current paths but also inductive couplings are present. Both types of couplings provide undesired feedback paths. Because of the rather complex problem, neutralization of each section separately fails without resort to complicated and critical circuitry.

The general operation of the neutralization system of the amplifier shown in Figure 3, is essentially the same as that described above in connection with Figures 1 and 2. A voltage of proper magnitude and phase is derived from the output circuit of the pentode and fed back to the cathode of the triode amplifier to balance out the voltage across the input capacity.

In the particular application to a TV 40 mc. intermediate frequency amplifier using a 6U8 type tube combination triode-pentode amplifier tube, it was found that when the circuit was properly neutralized, the parallel resonant circuit formed by the filament to ground inductor 81 and the capacitor 87 was tuned to the television channel 5 (79 mc.). This parallel resonant circuit is effectively connected across the input winding 48 shown in Figure 3. Since there is only about a 6 db attenuation between the input winding 48 and the mixer winding 42, any signals being received on channel 5 at 79 mc. were greatly attenuated by the parallel circuit.

To overcome this difficulty, a small capacitor, which in the present application was two micromicrofarads and indicated in Figure 3 as the capacitor 87, was connected between the anode 61 of the pentode amplifier tube 60 and the filaments to augment the inherent capacitance existing between these electrodes. This additional capacitance necessitates the readjustment of the effective inductance value existing between the filaments and ground to properly neutralize the amplifier. By effectively increasing the pentode anode to filament capacitance in this manner, it was possible to tune the parallel resonant circuit including the inductor 81 and the capacitor 84 to a frequency in the FM band (88–108 megacycles), hence, eliminating the attenuation of any television signal channel, while at the same time providing a complete neutralization of the triode amplifier.

In accordance with the invention, there has been described a neutralization circuit for tuned high frequency amplifiers which utilizes the inherent interelectrode capacitance of the amplifier tubes and enables efficient and effective neutralization with a reduced number of external circuit components.

What is claimed is:

1. In a 40 megacycle intermediate frequency amplifier for television receivers of the type including a triode tube and a pentode tube in a common envelope, said tubes each having an anode, a control electrode, a cathode and a filament for heating said cathode, means connecting the control electrode of said triode to ground for said amplifier, a signal input circuit connected between the cathode of said triode and ground, means providing a source of operating potential for said tubes connected with the anode of said pentode tube, means connecting the space current paths of said tubes in series comprising signal output circuit means for said triode connected from the anode of said triode to the cathode of said pentode, signal coupling means connected between said signal output circuit and the control electrode of said pentode for conveying signals amplified by said triode to said pentode, and a second signal output circuit connected with the anode of said pentode; the combination comprising a capacitor connected between the anode of said pentode and the filament of said triode, and means providing an inductor connected between the filament of the triode and said ground which resonates in parallel with the inherent filament-to-ground capacitance of said triode at a frequency between 88 to 108 megacycles, the effective reactive impedance of said parallel resonant circuit forming a series resonant circuit with the parallel combination of said capacitor and the inherent capacitance existing between the anode of the pentode and said triode filament tuned to a frequency above 40 megacycles, whereby a potential of proper phase is provided to neutralize said intermediate amplifier, the frequency of resonance of said series circuit being selected so that the potential across said parallel resonant circuit is of a magnitude to neutralize said intermediate frequency amplifier, said potential being fed through the inherent filament-to-cathode capacitance of the triode tube to the cathode of said triode tube.

2. A tuned frequency amplifier comprising in combination, a triode tube and a pentode tube in a common envelope, a filament circuit for said triode tube, signal input circuit means for signals of the tuned frequency connected with said triode, means providing a source of operating potential connected with said pentode amplifier, means connecting the space current paths of said triode and pentode tubes in series comprising a first signal output circuit connected between said triode and said pentode, a signal input circuit connected with said pentode, coupling means for conveying the fixed frequency signals developed across the first output circuit to the input circuit of said pentode amplifier, a second output circuit connected with said pentode, and means providing an inductor connected between said filament circuit and ground to neutralize said fixed frequency amplifier, said inductor being selected to form a parallel circuit with the inherent filament-to-ground capacitance which is resonant at a frequency above the fixed frequency, whereby said parallel resonant circuit appears inductive at the fixed frequency, the effective inductive reactance of said parallel resonant circuit being connected in series with the inherent capacitance between the filaments and the pentode output electrode and forming a circuit which is resonant at a frequency above the fixed frequency, the frequency of resonance of said series circuit being selected so that the voltage across said parallel circuit is of a magnitude to neutralize said tuned frequency amplifier.

3. The combination with an intermediate frequency amplifier of the type including an electron tube having an anode, a control electrode, a cathode and a filament for heating said cathode, an intermediate frequency signal input circuit for said amplifier connected with said cathode, means connecting said control electrode at signal ground potential, and an output circuit for said intermediate frequency amplifier connected with said anode, of a neutralizing circuit comprising an inductor connected between said filament and signal ground, said inductor and the inherent filament to ground capacitance of said tube forming a parallel circuit resonant at a frequency above said intermediate frequency, the effective inductance of said parallel circuit at said intermediate frequency and the capacitance between said output circuit and said filament forming a series circuit resonant at a frequency above said intermediate frequency to provide a potential across the parallel circuit of the proper amplitude to neutralize said amplifier.

4. The combination with a high frequency amplifier of the type including an electron tube having an anode, a control electrode, a cathode and a filament for heating said cathode, a high frequency signal input circuit for said amplifier connected with said cathode, means connecting said control electrode at ground potential for signal frequencies, and an output circuit for said high frequency amplifier connected with said anode; of a neutralizing circuit comprising an inductor connected between said filament and signal ground, said inductor and the inherent filament to ground capacitance of said tube forming a parallel circuit resonant at a frequency above said high frequency, the effective inductance of said parallel circuit at said high frequency and the capacitance between said output circuit and said filament forming a series circuit resonant at a frequency above said high frequency to provide a neutralizing potential across the parallel circuit of the proper phase to neutralize said amplifier, and means comprising the inherent filament-to-cathode capacitance of said tube for applying said neutralizing potential to said signal input circuit.

References Cited in the file of this patent

UNITED STATES PATENTS

| | | |
|---|---|---|
| 2,463,229 | Wheeler | Mar. 1, 1949 |
| 2,524,821 | Montgomery | Oct. 10, 1950 |
| 2,692,219 | Cohen | Oct. 26, 1954 |